A. N. WARFIELD.
FREIGHT CAR CONSTRUCTION.
APPLICATION FILED DEC. 11, 1917.

1,330,415.

Patented Feb. 10, 1920.
3 SHEETS—SHEET 1.

Witness
Chas. W. Stauffiger
Karl H. Butler

Inventor
Aaron N. Warfield,
By Paschet & Paschet
Attorneys

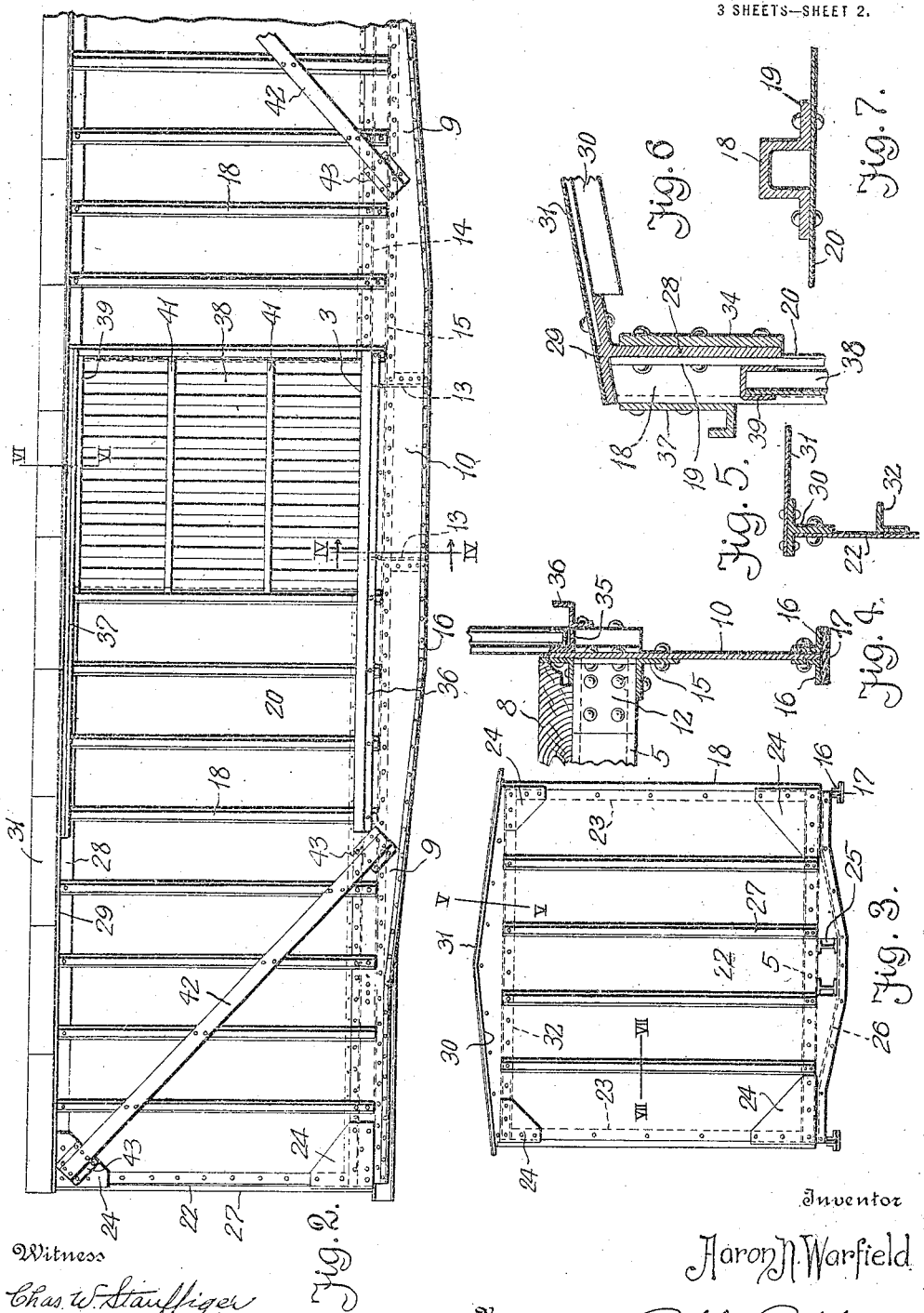

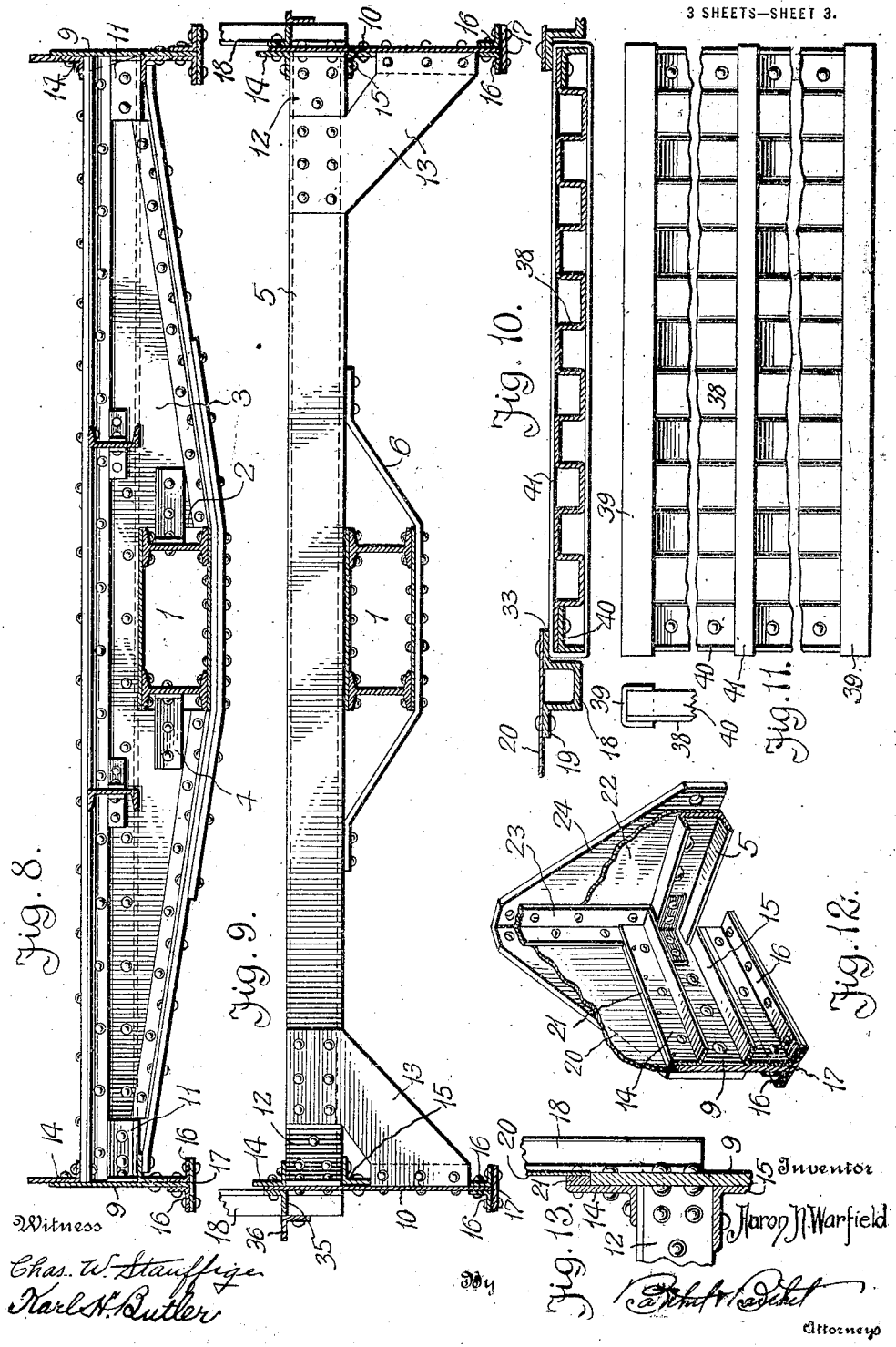

UNITED STATES PATENT OFFICE.

AARON N. WARFIELD, OF LONDON, ONTARIO, CANADA.

FREIGHT-CAR CONSTRUCTION.

1,330,415. Specification of Letters Patent. Patented Feb. 10, 1920.

Application filed December 11, 1917. Serial No. 206,629.

*To all whom it may concern:*

Be it known that I, AARON N. WARFIELD, a citizen of the United States, residing at London, in the county of Middlesex, Province of Ontario, Dominion of Canada, have invented certain new and useful Improvements in Freight-Car Construction, of which the following is a specification, reference being had therein to the accompanying drawings.

In the manufacture of metallic freight cars, or as a matter of fact any metallic car providing a complete inclosure, it has been the practice to use a preponderant amount of metal to obtain strength and rigidity, and a great deal of metal has been indiscriminately distributed. This has been undoubtedly incurred owing to the fact that special shapes or specially-designed metallic parts have been used throughout the construction of a car without considering whether such parts were properly disposed and served any purpose other than a connecting part in the fabricated car. Then again, braces, struts, beams and other parts have been extensively used so as to provide a supposed rigidity, and consequently the weight of a car has been increased to such an extent as to reduce the number of cars, when loaded, to a train, and this has been a serious drawback for expeditiously moving freight. It has necessitated smaller cars, a greater number, small loads, and considerable work incident to maintenance and operation by a railroad company. In designing such cars, it is believed that cars injured from collision have not been properly studied to ascertain how much impact the underframing or other parts of a car will withstand; what the elastic limit of the car should be loaded or unloaded, and the minimum weight for a car fully loaded and of standard size.

With my invention these and other points have been considered and the maximum compression of impact in collision, so that the elastic limit of the steel will not be reached, and other essential conditions computed until the resultant car, forming the subject matter of this application, possesses the advantages and characteristics not obtained or found in connection with the present type of rolling stock.

First, the freight car to be hereinafter referred to has an underframing made entirely of structural standardized steel shapes and includes side web girders that will constitute the side of the car. The girders extend throughout the length of the underframing and are connected sufficiently to sustain a car floor and at the same time prevent inward or outward buckling of the girders. The girders are longitudinally stiffened and are capable of carrying the line load and also part of the impact or any other distortion. Each and every part of the underframing has been disposed to contribute to a rigid structure, and the weight of the underframing has been reduced to a minimum so that the weight of the complete car will be materially less than rolling stock of the same type, will carry one-third more than a line load, and will resist an impact again as much as any type now in use.

Second, the body of the freight car on the underframing is constructed in a similar manner, and besides possessing that degree of rigidity essential for maintaining a housing or inclosure for a load, the body of the car is braced and anchored so as to assist the underframing in receiving any impact or stresses and strains that would tend to distort the same. Side bracing of the body prevents the body frame shifting or longitudinally swaying relative to the underframing, especially when receiving an end blow, and the disposal of all parts has been calculated so that the car may be of minimum weight, standard size, and capable of safely carrying a third more than the present car with from six to eight thousand pounds less dead load per car.

The above are only a few of the characteristics of my freight car, which will be hereinafter specifically described and then claimed, and reference will now be had to the drawing, wherein—

Fig. 2 is a side elevation of a portion of the freight car showing the side bracing;

Fig. 3 is an end view of the same;

Fig. 4 is an enlarged detailed sectional view on the line IV—IV of Fig. 2;

Fig. 5 is a similar view taken on the line V—V of Fig. 3;

Fig. 6 is a similar view taken on the line VI—VI of Fig. 2;

Fig. 7 is a horizontal sectional view taken on the line VII—VII of Fig. 3;

Fig. 8 is a front elevation of a bolster;

Fig. 9 is an enlarged cross sectional view of the car and doorway thereof;

Fig. 10 is a horizontal sectional view of the freight car door;

Fig. 11 shows fragmentary views of the door;

Fig. 12 is a perspective view showing the corner construction of the car;

Fig. 13 is a detailed sectional view of a portion of the car.

Figure 1:
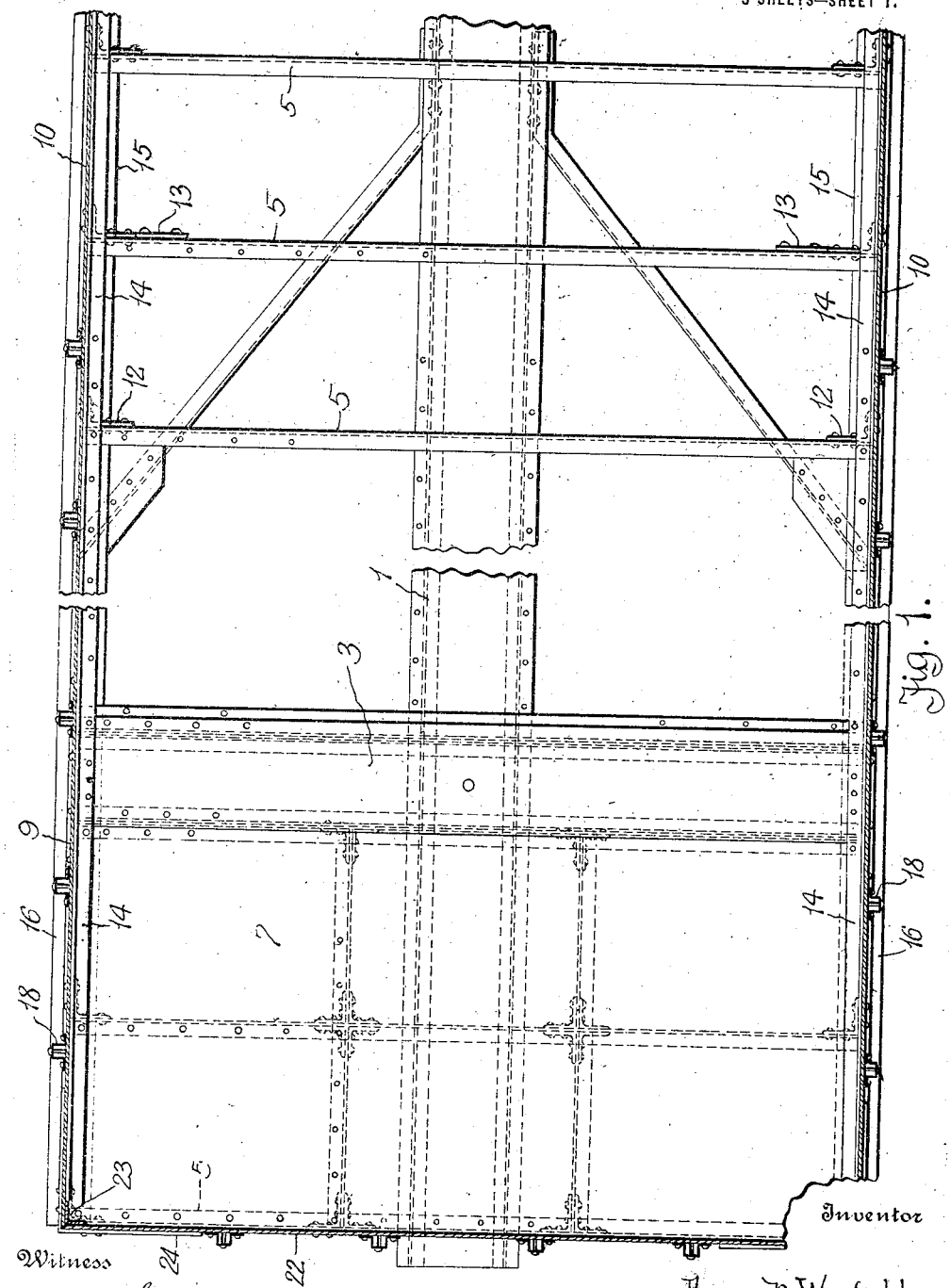
Figure 1 is a horizontal sectional view of a portion of a freight car, partly broken away, and showing the underframing of the same.

In the drawings, the reference numeral 1 generally denotes a longitudinal central box beam or girder composed of I beams and top and bottom plates riveted or otherwise connected together and the ends of the box girder extend through openings 2 provided therefor in bolsters 3. The bolsters 3 are made of channel members, angle bars and plates, all securely connected together so as to form rigid, transverse members on the box girder 1. The central portions of the bolsters 3 may be riveted or otherwise connected to the box girder and it is preferable to use angle brackets 4 at the sides of the bolsters for connecting said bolsters to the I beams of the box girder, as best shown in Fig. 8.

Mounted on the box girder 1 and suitably spaced throughout the length of the car are transverse channel members 5 and these members are connected to the box girders by rivets through the top plate and by straps 6. The upper edges of the channel members 5 are in a plane with the upper edges or faces of the bolsters 3, and on said channel members and the bolsters may be placed floor plates 7 or a suitable flooring, for instance as indicated at 8 in Fig. 4.

Mounted against the end channel members 5 and the bolsters 3 are wide web plate girders or sills 9 each made of a single plate extending throughout the length of the car. As clearly shown in Fig. 2, each side web plate girder has a central portion 10 of greater depth than the ends of said girder, the central portion 10 gradually tapering to the bolsters and thus providing a truss-like member at each side of the car. The inner side of the girders 9 are connected to the bolsters 3 by angle connections 11 and to the ends of the channel bars 5 by angle connections 12, while at the central portions 10 of the side girders 9, there are vertically disposed angular gusset plates 13 connecting the centralmost channel members 5 to the inner sides of the girders 9, as best shown in Fig. 9.

Extending longitudinally of the inner walls of the girders 9 are top and center angle bars 14 and 15 and these angle bars are riveted or otherwise connected to the side girders 9 and to the upper and lower edges of the channel members 5 and the bolsters 3. These longitudinal angle bars stiffen the side girders at the ends of the channel members 5 and the bolsters 3, thus adding rigidity to the edges of the side girders, so that they can not buckle. The lower edges of the side girders are stiffened by angle bars 16 on both sides of each girder and said angle bars, at each girder, are connected by a bottom cover plate 17.

Connected to the outer sides of the side girders 9, at the upper edges thereof, are a plurality of equally spaced vertical members 18, and these members are U-shaped in cross section with lateral flanges 19 throughout the length thereof. The vertical members 18 are of equal height and riveted or otherwise connected to the lateral flanges 19 of said vertical members is sheathing 20 forming the side walls of the car. The lower edges of the sheathing 20 rest on the upper edges of the side girders 9, as best shown in Fig. 13, and a filler 21 is placed between the sheathing 20 and the top angle bar 14 at each side girder. Rivets or other fastening means may connect the sheathing 20, the filler 21 and the top angle bar 14, thus tying the lower edges of the sheathing to the side girders and channel members 5 and the bolsters 3, with the vertical members 18 stiffening and adding rigidity to the sheathing which forms the side walls of a car.

The end walls of the car are also formed of sheathing 22 having the vertical edges thereof abutting the vertical edges of the side wall sheathing 20 and at the vertical edges or juncture of the sheathings 20 and 22, there are inner angle bars 23 riveted or otherwise connected to the sheathing so as to form a rigid connection of the sheathing at the corners of the car. Gusset corner plates 24 are also employed for this purpose, and said gusset plates are placed at the upper and lower corners of the car body, as best shown in Figs. 2 and 3. It is in Fig. 3 that it will be noted how the end sheathing 22 extends downwardly and has an opening 25 to provide clearance for any draft rigging that may be placed in the ends of the box girder 1. The depending edges of the end sheathing 22 are reinforced or stiffened by suitable angle truss members 26 and the outer sides of the end sheathing 22 have vertical members 27, similar to the members 18, the members 27, as well as the members 18 may have the lateral flanges thereof spot welded or otherwise connected to the sheathing 22 and 20.

The upper ends of the vertical members 18 are connected to longitudinal T members 28, and the sheathing 20 extends on to the under sides of said T members. The heads 29 of the special rolled T members are angularly disposed to extend over the upper ends of the vertical members 18 and said heads also support the ends of transversely disposed arched T members 30, said T members being equally spaced and providing roof supports for a roof sheathing 31 that may be riveted or otherwise connected to the T members and the heads 29 of the T members 28.

At the end walls of the car, the sheathing 22 is extended to the endmost T members 30 of the roof, as shown in Fig. 5, and is suitably connected thereto.

Intermediate the ends of the car the sheathing 20 and certain of the vertical members 18 are dispensed with in order to provide side doorways 33 and the upper and lower edges of the doorways may be reinforced at the top by channel members 37, one leg of the member longer than the other for fastening to the members 18, thus providing a door rail. At the lower edges of the doorway are angle bars 35 and Z bars 36, the former providing a door sill and the latter a door rail, which extends to one side of the doorway, and is connected to the vertical members 18, as best shown in Fig. 2. The rail 37 is connected to the upper ends of certain of the members 18, said rail being disposed at the upper edge or lintel of the doorway, and the rails 36 and 37 may coöperate with suitable hangers or other devices in supporting a door for the doorway. The preferred form of door has been shown in Figs. 2, 10 and 11, as composed of a vertically corrugated sheet of metal 38 having the upper and lower edges thereof provided with channels 39. The vertical edges of the door may be stiffened and reinforced by bars 40 and straps 41 that may surround the door intermediate the upper and lower ends thereof. The corrugated sheet of metal 38 is adapted to be spot welded or otherwise connected to the straps 41, the angle bars 40 and channels 39, so as to form a rigid, metallic door that may be suitably hung, shifted or secured in place by hangers or devices (not shown).

The outer sides of the car body, at the ends thereof, are provided with angularly disposed braces or tension and compression members 42 preferably in the form of flat plates extending from the side girders 9 upwardly to the upper corner gusset plates 24 at the ends of the car. The upper gusset plates 24 and the side girders 9 have supports 43 riveted or otherwise connected thereto, said supports having a cross sectional shape similar to the members 18. The braces or members 42 are riveted or otherwise connected to the supports 43 and also the members 18, as best shown in Fig. 2. The braces or anchorage members 42 at the ends of the car body prevent the car body from swaying ahead when the impact at the bottom would force the bottom back and from being racked when subjected to stresses and strains, due to impact or placing the car in motion or when stopping the same, and it is in this connection that the side web plate girders coöperate with the underframing of the car body in providing a structure capable of receiving considerable endwise impact without buckling or crushing, and this has been obtained by a very light construction which permits of a greater number of cars to a train and at the same time allows the cars to receive maximum load. The important item of making repairs has also entered into the construction of the car, and ordinary standardized structural shapes have been mostly employed, and outside of the side web plate girders 9, there are no parts of the car that cannot be easily obtained for repair purposes.

One embodiment of my invention has been illustrated but it is to be understood that the structural elements are susceptible to such variations and modifications, as fall within the scope of the appended claims.

What I claim is:—

1. An underframing for metallic cars comprising a longitudinal box girder, bolsters and frames transversely thereof, web plate side girders connected to the ends of said bolsters and said frames, said web plate side girders having center portions of greater depth than the ends of the girders to provide truss-like members at the sides of the underframing, top and center angle bars at the inner walls of said girders and throughout the length thereof, and angle bars on the lower edges of said girders at both sides thereof and extending throughout the length of said girders.

2. An underframing for metallic cars comprising a longitudinal center box girder, bolsters and frames transversely thereof and connected to said box girder, web plate girders at the ends of said bolsters and said frames and providing uninterrupted truss-like members throughout the length of the underframing, angle connections carried by the inner walls of said girders and connected to said bolsters and some of said frames, angular gusset plates connecting said girders to other of said frames, top and center angle bars on the inner walls of said girders throughout the length thereof and connected to the upper and lower edges of said bolsters, and said frames, and angle bars at the lower edges of said girders and throughout the length thereof.

In testimony whereof I affix my signature in the presence of two witnesses.

AARON N. WARFIELD.

Witnesses:
KARL H. BUTLER,
CHAS. W. STAUFFIGER.